F. J. & E. D. RICE & A. G. BARRETT.
FRICTION TRANSMISSION GEAR.
APPLICATION FILED JULY 14, 1908.
914,977.
Patented Mar. 9, 1909.
2 SHEETS—SHEET 2.
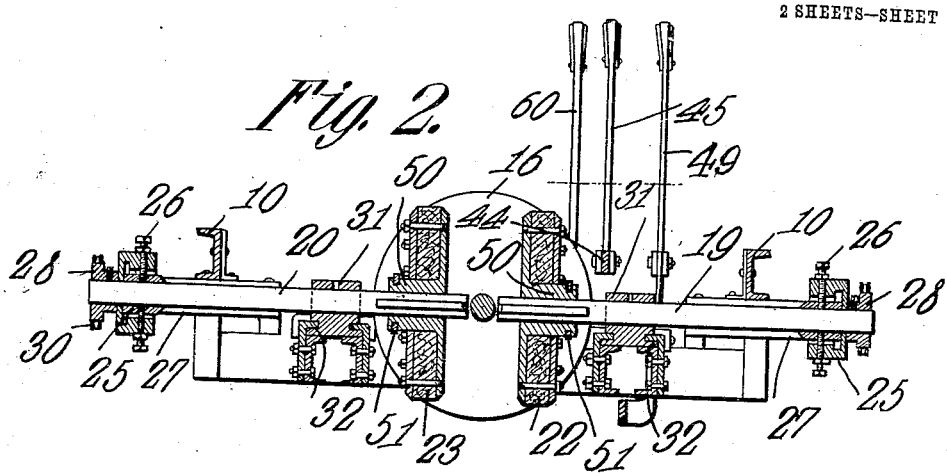

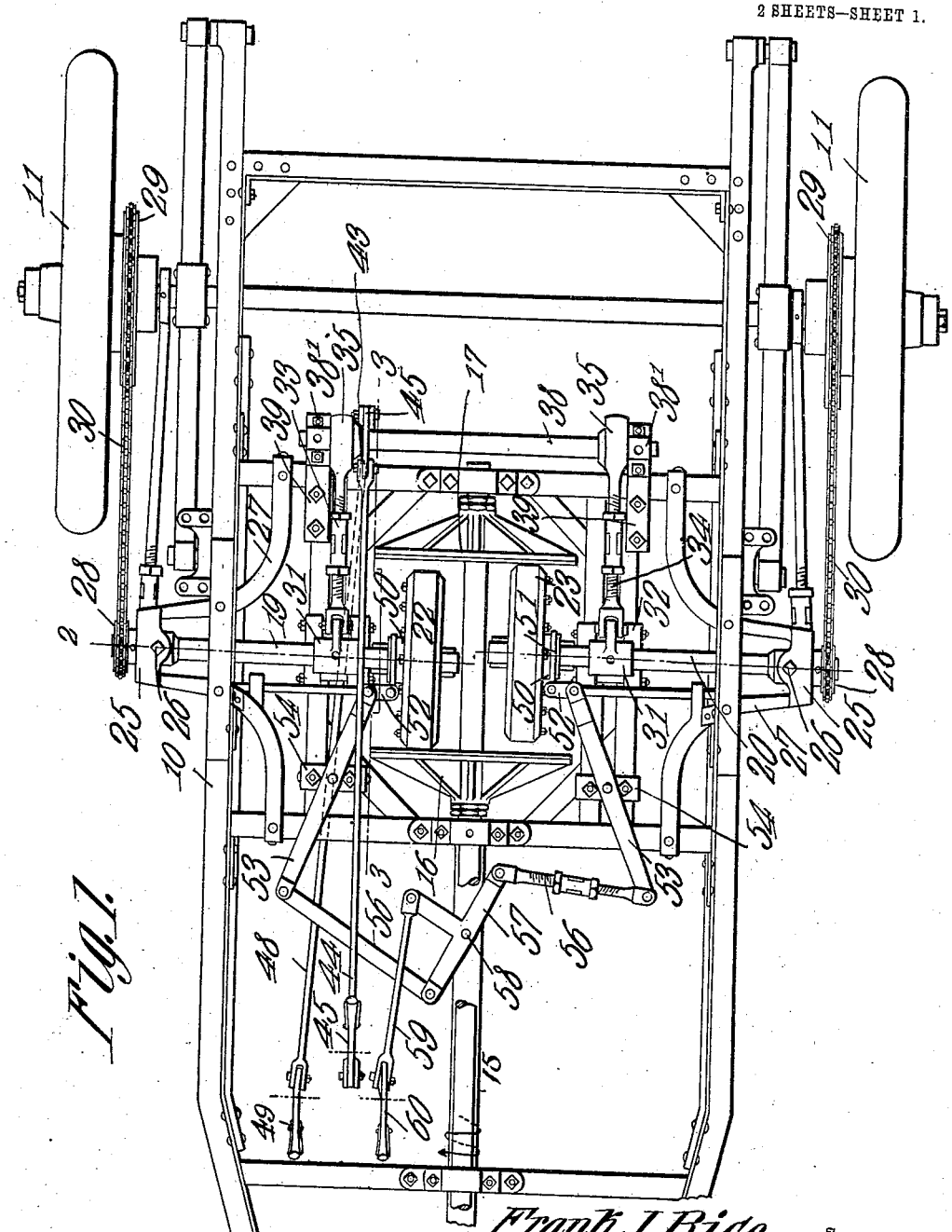

UNITED STATES PATENT OFFICE.

FRANK J. RICE, ELMER D. RICE, AND AMASA G. BARRETT, OF BLACKWELL, OKLAHOMA.

FRICTION-TRANSMISSION GEAR.

No. 914,977.  Specification of Letters Patent.  Patented March 9, 1909.

Application filed July 14, 1908. Serial No. 443,502.

*To all whom it may concern:*

Be it known that we, FRANK J. RICE, ELMER D. RICE, and AMASA G. BARRETT, citizens of the United States, residing at Blackwell, in the county of Kay, State of Oklahoma, have invented a new and useful Friction-Transmission Gear, of which the following is a specification.

This invention relates to frictional power transmitting devices, and has for its principal object to provide a novel form of friction drive gear more especially adapted for use in connection with automobiles and similar vehicles.

A further object of the invention is to provide a friction driving mechanism wherein the motive power may be applied, transmitted, and controlled in strength, speed and direction without in any manner changing the strength, speed or direction of the motive power.

A still further object of the invention is to provide a novel form of friction gear in which a constantly operated prime motor may be employed, and its power transmitted in either direction or at any speed to the propelling or other wheels.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings; Figure 1 is a plan view of a friction gearing constructed and arranged in accordance with the present invention. Fig. 2 is a transverse sectional view of a portion of the same on the line 2—2 of Fig. 1. Fig. 3 is a section on the line 3—3 of Fig. 1. Fig. 4 is a detail sectional view of the lock shaft showing the relative locations of the eccentrics.

Similar numerals of reference are employed to indicate corresponding parts throughout the several figures of the drawings.

The invention in the present instance is shown as applied to the propelling mechanism of an automobile or similar vehicle, a portion of the frame 10 and the rear or propelling wheels 11 of the machine being shown.

Mounted in suitable bearings on the frame is the primary or motor shaft 15, and to this shaft are secured a pair of opposing friction disks 16 and 17, which are continuously rotated with the shaft in the same direction.

Arranged at a right angle to the longitudinal axis of the shaft 15 are two shafts 19 and 20, the inner ends of which approach the periphery of the shaft 15. On these shafts are mounted friction disks 22, 23, which may be provided with friction surfaces of paper, leather, or other suitable material, the disks 22 and 23 being movable into and out of contact with the driving disks 16 and 17 and being feathered on their respective shafts, so that they may be moved radially of the drive disks for the purpose of altering the speed at which the power is transmitted. The outer end of each of the shafts 19 and 20 is mounted in a bearing 25 that is hung on pivot pins 26 carried by brackets 27 projecting from the fixed frame, and to the outer end of each shaft is secured a sprocket wheel 28 that is connected to a driven sprocket 29 on the wheel hub by means of a link belt 30. The inner portion of each of the intermediate shafts 19 and 20 passes through a bearing block 31 that is slidably mounted in dove-tailed guides 32 on the fixed frame and these bearing blocks are connected by rods 33, 34, to eccentric straps 35 that encircle a pair of diametrically opposed eccentrics 36, 37 on a rock shaft 38. The shaft 38 is mounted in suitable bearings, 38', in brackets 39 secured to the fixed frame.

Secured to the rock shaft 38 is a two armed lever, the upper arm 43 of which is connected by a rod 44 to a suitable hand lever 45 arranged within convenient reach of the chauffeur or driver while the lower arm 47 of the lever is connected by a rod 48 to a second hand lever 49.

The primary shaft 15 is continuously rotated from left to right in the direction indicated by the arrow in Fig. 1, and when it is desired to travel in a forward direction the hand lever 45 is thrust forward, thus pulling on the rod 44 and turning the rock shaft 38 through a short arc. The eccentrics of the rock shaft are so disposed that the bearing which carries the inner end of the shaft 19 will be thrust forward and disk 22 will be brought into frictional engagement with the drive disk 17, while the bearing which carries the inner end of the shaft 20 will be drawn rearward and the friction disk 23 will be forced into engagement with the driving disk 16. As the two disks 16 and 17 rotate in the same direction with the shaft 15, movement will be imparted through the several friction disks and shafts and the sprocket connections to the propelling wheels 11 for the purpose of driving the vehicle forward.

When it is desired to reverse, the hand lever 49 is moved forward, thus pulling on the rod 48 and the rock shaft 38 is turned in the opposite direction, so that the friction disk 22 is forced into engagement with the driver disk 16 and friction disk 23 is forced into engagement with the driver disk 17, and as the shaft 15 continues to rotate in the same direction, the intermediate shafts 19 and 20 will be driven in the reverse direction and the vehicle will move rearward.

To the outer face of each of the intermediate friction disks is secured a hub 50 that is provided with a continuous annular groove for the reception of a ring 51 that is connected by a link 52 to a lever 53, the latter being fulcrumed on a bracket 54 carried by the main frame. The two levers 53 extend forward of the general frame and are connected by links 56 to a three armed lever 57 that is pivoted on a stationary stud 58 and the central arm of this lever is connected by a rod 59 to a hand lever 60 within convenient reach of the chauffeur or other attendant.

By operating the lever 60 the two disks 22 and 23 may be caused to approach or recede and as they move in a line radial of the drive disks 16 and 17 the adjustment will move the disks 22 and 23 radially of the disks 16 and 17. When the friction disks are moved close to the driving shaft 15, the speed transmitted to the traffic or propelling wheels will be reduced and as the friction disks are moved outward toward the periphery of the drive disks, the speed will be greatly increased, and this adjustment may be accomplished without stopping the machine or without stopping the operation of the primary motor.

It will be noted that the bearings for the intermediate shafts 19 and 20 are wholly beyond the outer faces of the friction disks, so that the opposing faces of these disks may be moved close to the shaft 15 and thus brought very near the center of the main or drive disks 16 and 17, the machine being thus propelled at very slow speed, but proportionately increased in power owing to the greater leverage force which may thus be exerted on the intermediate friction disks.

What is claimed is:—

1. In friction transmission gearing, a main drive shaft, a pair of opposing friction drive disks permanently secured thereto, a pair of intermediate shafts disposed approximately at a right angle to the axis of the drive shaft, movable bearings for the intermediate shafts disposed adjacent the outer ends and intermediate portions of said shafts, intermediate friction disks mounted on said intermediate shafts at points adjacent the inner or free ends of the shafts, means for simultaneously adjusting the intermediate shafts in opposite directions, respectively, and means for simultaneously moving the intermediate friction disks toward and from each other to increase or decrease the speed of said intermediate shafts.

2. In friction transmission gearing, a frame, a main drive shaft mounted in bearings on the frame, a pair of friction drive disks permanently secured to said shaft, a pair of intermediate shafts disposed approximately at a right angle to the axis of the drive shaft, rocking bearings for the outer ends of the intermediate shafts, slidable bearing blocks for the support of the inner portions of the intermediate shafts, friction disks feathered on said intermediate shafts and arranged to engage the driving disks, said intermediate disks being provided with grooved hubs, a rock shaft journaled in the frame, a pair of eccentrics carried by the rock shaft, eccentric straps on the eccentrics, connecting rods extending from the straps to the slidable bearings, a two armed lever on the rock shaft, a pair of operating levers connected to said two armed lever, rings or collars fitting within the grooves of the friction disk hubs, disk shifting levers connected to said rings or collars, and means for simultaneously operating said shifting levers to move the intermediate disks toward and from each other, substantially as specified.

In testimony that we claim the foregoing as our own, we have hereto affixed our signatures in the presence of two witnesses.

FRANK J. RICE.
ELMER D. RICE.
AMASA G. BARRETT.

Witnesses:
 GEO. N. DANCE,
 D. S. ROSE.